United States Patent
Ratti et al.

(10) Patent No.: US 10,288,990 B1
(45) Date of Patent: May 14, 2019

(54) CALCULATION OF BEAM SPEED AND POSITION IN A LASER PROJECTION SYSTEM USING A GRAPHICS PROCESSING UNIT

(71) Applicants: STMicroelectronics S.r.l., Agrate Brianza (IT); STMicroelectronics Ltd, Netanya (IL)

(72) Inventors: Massimo Ratti, Bernareggio (IT); Eli Yaser, Tel Aviv (IL); Naomi Petrushevsky, Yavne (IL); Massimiliano Barone, Cormano (IT)

(73) Assignees: STMicroelectronics S.r.l., Agrate Brianza (IT); STMicroelectronics Ltd, Netanya (IL)

( * ) Notice: Subject to any disclaimer, the term of this patent is extended or adjusted under 35 U.S.C. 154(b) by 0 days.

(21) Appl. No.: 15/850,667

(22) Filed: Dec. 21, 2017

(51) Int. Cl.
  *H04N 5/74* (2006.01)
  *G03B 21/20* (2006.01)
  *G02B 27/24* (2006.01)
  *G02B 27/18* (2006.01)

(52) U.S. Cl.
  CPC ......... *G03B 21/2033* (2013.01); *G02B 27/18* (2013.01); *G02B 27/24* (2013.01); *H04N 5/74* (2013.01)

(58) Field of Classification Search
  CPC ...... H04N 5/74; G03B 21/2033; G02B 27/18; G02B 27/24
  USPC ........................................................ 348/756
  See application file for complete search history.

(56) References Cited

U.S. PATENT DOCUMENTS

| | | | |
|---|---|---|---|
| 2007/0146346 A1* | 6/2007 | Sata | G06F 3/03547 345/173 |
| 2009/0244389 A1* | 10/2009 | Mishima | G06T 3/4007 348/699 |
| 2010/0002152 A1* | 1/2010 | Nishioka | G09G 3/02 348/744 |
| 2011/0129015 A1* | 6/2011 | Nguyen | H04N 19/51 375/240.16 |
| 2011/0205498 A1 | 8/2011 | Brown et al. | |
| 2011/0298844 A1 | 12/2011 | Butler et al. | |
| 2014/0126590 A1* | 5/2014 | Kimura | H04N 9/3135 372/24 |

* cited by examiner

*Primary Examiner* — Michael Lee
(74) *Attorney, Agent, or Firm* — Crowe & Dunlevy

(57) ABSTRACT

Disclosed herein is a laser projection system including a laser projector emitting a laser beam, a movable mirror apparatus reflecting the laser beam toward a surface, and a graphics processing unit (GPU). The GPU is configured to receive video data, estimate a varying speed of movement of the movable mirror apparatus for different positions of the laser beam across the surface, and process the video data based upon the estimated varying speed of movement. An application specific integrated circuit (ASIC) receives the processed video data, and to generate a beam position control signal based upon required or desired movement of the movable mirror apparatus. A laser driver controls the laser projector as a function of the processed video data, and a mirror controller controls the movable mirror apparatus as a function of the beam position control signal.

27 Claims, 5 Drawing Sheets

CALCULATION OF BEAM SPEED AND POSITION IN A LASER PROJECTION SYSTEM USING A GRAPHICS PROCESSING UNIT

TECHNICAL FIELD

This application is related to the field of laser projection systems, and, in particular, to the use of a graphics processing unit (GPU) in making beam speed and position calculations in a laser scanning system, thereby eliminating the need for a specially programmed application specific integrated circuit (ASIC).

BACKGROUND

Laser projection systems, such as those used in picoprojectors, typically include an application processor, a projection subsystem, and an optical module. The application processor functions to serve a video stream to the projection subsystem. The projection subsystem processes the video stream, and based upon that processing, properly drives the optical module so as to project the video onto a surface for viewing.

Typically, the projection subsystem includes an application specific integrated circuit (ASIC) that receives the video input from the application processor and controls a laser source driver and a mirror controller appropriately so as to effectuate control of the optical module by the laser source drives and mirror controller to project the video. The ASIC must be specifically designed to work with the geometry of the specific optical module used.

Since the ASIC must be specifically designed, the cost of developing a laser projection is higher than desired, since no "off the shelf" solution exists for the functionality provided by the ASIC. For each application, a new ASIC must be specifically designed. In order to lower the cost of development, further development in this area is needed so as to provide for an "off the shelf" hardware solution.

SUMMARY

Disclosed herein is a laser projection system including a laser projector configured to emit a laser beam, a movable mirror apparatus configured to reflect the laser beam toward a surface, and a graphics processing unit (GPU). The GPU is configured to receive video data, estimate a position of the laser beam on the surface as a function of varying speed of movement of the movable mirror apparatus for different positions of the laser beam across the surface, based upon the video data, and process the video data based upon the estimated varying speed of movement. An application specific integrated circuit (ASIC) is configured to receive the processed video data, and to generate a beam position control signal based on characteristics of the movable mirror apparatus. A laser driver is configured to control the laser projector as a function of the processed video data, and a mirror controller is configured to control the movable mirror apparatus as a function of the beam position control signal.

In some cases, the ASIC may be configured to recover the estimated varying speed of movement of the movable mirror apparatus at different positions of the laser beam across the surface from the processed video data, and to further process the processed video data so as to modulate brightness of the processed video data based upon the estimated varying speed of movement of the movable mirror apparatus at different positions of the laser beam across the surface.

In other cases, the GPU may be configured to process the video data so as to modulate brightness of the video data based upon the estimated varying speed of movement of the movable mirror apparatus at different positions of the laser beam across the surface.

The video data may otherwise be displayed in a distorted fashion (appear distorted to the human eye) due to curved motion of the laser beam across the surface, and the GPU processes the video data by predistorting the video data so as to produce predistorted video data that will display in a non-distorted fashion despite the curved motion of the laser beam across the surface, based upon the different positions of the laser beam across the surface.

The GPU may predistort the video data by defining a two dimensional grid, with each element in the two dimensional grid representing the laser beam position at a different time, and map each location in the two dimensional grid based to a corresponding pixel of a frame of the received video data based upon the different positions of the laser beam in the curved motion across the surface.

The GPU may process the video data by embedding the estimated varying speed of movement of the movable mirror apparatus at the different positions of the laser beam across the surface in the processed video data as metadata.

The laser projector may include a laser generator configured to generate a collimated light beam and an optical module configured to focus the collimated light beam into the laser beam, and the GPU may also generate the varying speed of movement based upon characteristics of the optical module and characteristics of the movable mirror apparatus.

The ASIC may be generic to optical modules regardless of characteristics thereof and is generic to movable mirror apparatuses regardless of characteristics thereof. In addition, the GPU may have a massively parallel architecture, and is not an application specific integrated circuit (ASIC).

The GPU may process the video data by upsampling the video data.

The GPU, during a setup phase, may store the estimated varying speed of movement of the movable mirror apparatus at the different positions of the laser beam across the surface in a lookup table as beam speed and beam position values.

The GPU, during subsequent operation, may estimate the varying of movement of the movable mirror apparatus at the different positions of the laser beam across the surface by performing a lookup in the lookup table.

Also disclosed herein is a laser projection system including a laser projector configured to emit a laser beam, a movable mirror apparatus configured to reflect the laser beam toward a surface, and a graphics processing unit (GPU). The GPU is configured to receive video data, estimate a varying speed of movement of the movable mirror apparatus for different positions of the laser beam across the surface, based upon the video data, and process the video data based upon the estimated varying speed of movement. An application specific integrated circuit (ASIC) is configured to receive the processed video data, and to generate a beam position control signal based on the characteristics of the movable mirror apparatus and the required movement of the movable mirror apparatus. In some cases, the ASIC may additionally or alternatively generate a laser driver control signal based upon the received processed video data. A laser driver is configured to control the laser projector as a function of the processed video data and/or the laser driver control signal. A mirror controller is configured to control the movable mirror apparatus as a function of the beam position control signal.

Also disclosed herein is a method of manufacturing a laser projection system including selecting a laser projector including a laser generator and an optical module, and placing the selected laser projector into a housing, selecting a movable mirror apparatus and placing the movable mirror apparatus in the housing, selecting a graphics processing unit (GPU), and based upon specific characteristics of the selected optical module and the movable mirror apparatus, programming the GPU to perform projection engine functions, including beam speed determination, beam position determination, and processing of received video data based upon the beam speed determination and the beam position determination. The method also includes selecting a generic application specific integrated circuit (ASIC) and programming the generic ASIC to execute a predefined set of operations, generic to multiple different suitable laser projectors and multiple suitable different movable mirror apparatuses, based upon at least the processed video data, as received from the GPU. The method further includes selecting a laser driver and placing the driver in the housing, and configuring the laser driver to be controlled by the ASIC, and selecting a mirror controller and placing the mirror controller in the housing, and configuring the mirror controller to be controlled by the ASIC.

DETAILED DESCRIPTION

Figure 1:
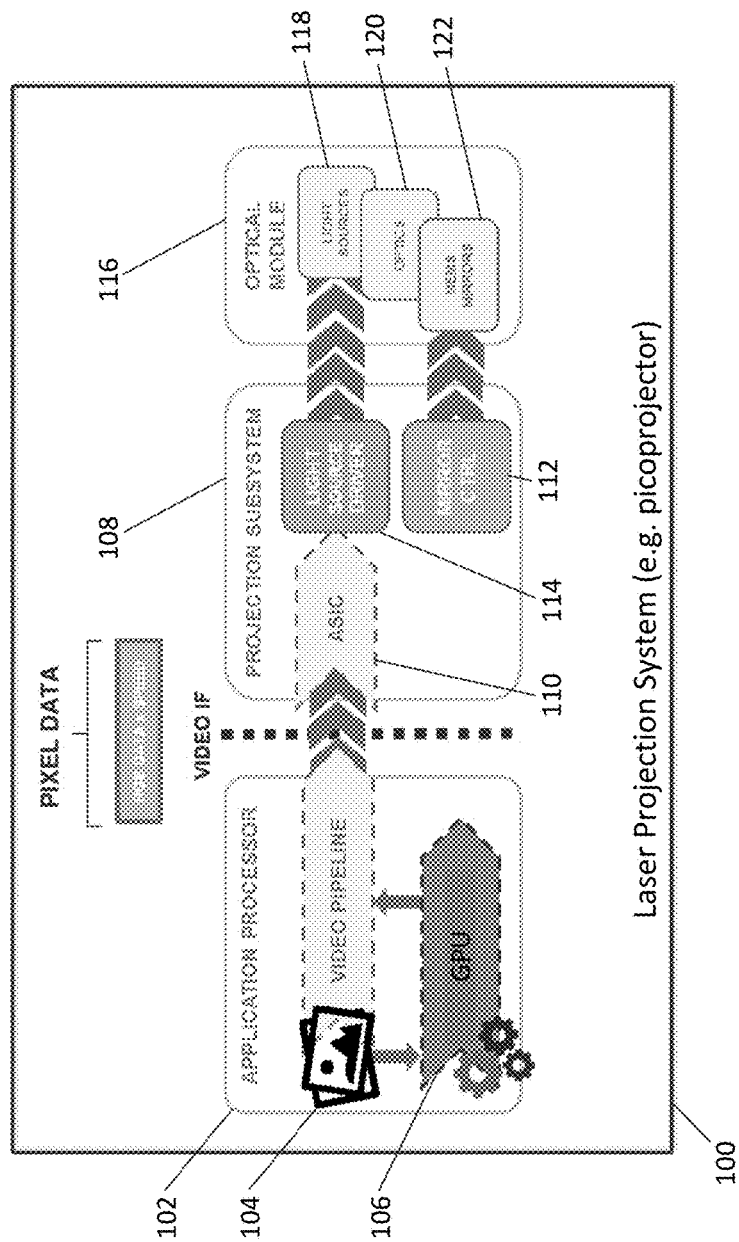
FIG. 1 is a schematic block diagram of a laser projection system in accordance with this disclosure.

Described with reference to FIG. 1 is a laser projection system 100. The laser projection system 100 may be a self-contained picoprojector, may be an add-on device for a smartphone or tablet, or may be contained within a smartphone depending upon the specific application.

The laser projection system 100 includes an application processor 102, such as a system on a chip, which includes a separate graphics processing unit (GPS) 106. It should be understood that the GPU 106 contains a massively parallel architecture and is not simply a general purpose microprocessor, but is instead a GPU as understood by those of skill in the art. Stated another way, a general purpose microprocessor capable of performing graphical functions and calculations related to graphics is not a GPU—a GPU has a massively parallel architecture as known to those of skill in the art, which is unlike the architecture of a general purpose microprocessor.

As will be explained below, the application processor 102 provides data to a projection subsystem 108, which itself includes an ASIC 110, a mirror controller 112, and a light source driver 114. The projection subsystem provides output to the optical module 116, which itself includes light sources 118 (lasers), optics 120 (lenses), and mirrors 122 (microelectromechanical mirrors). The optical module 116 operates to scan a laser beam across a video display area at a rate sufficient to create a static or moving image when viewed by humans, under control of the projection subsystem 108.

Figure 2:
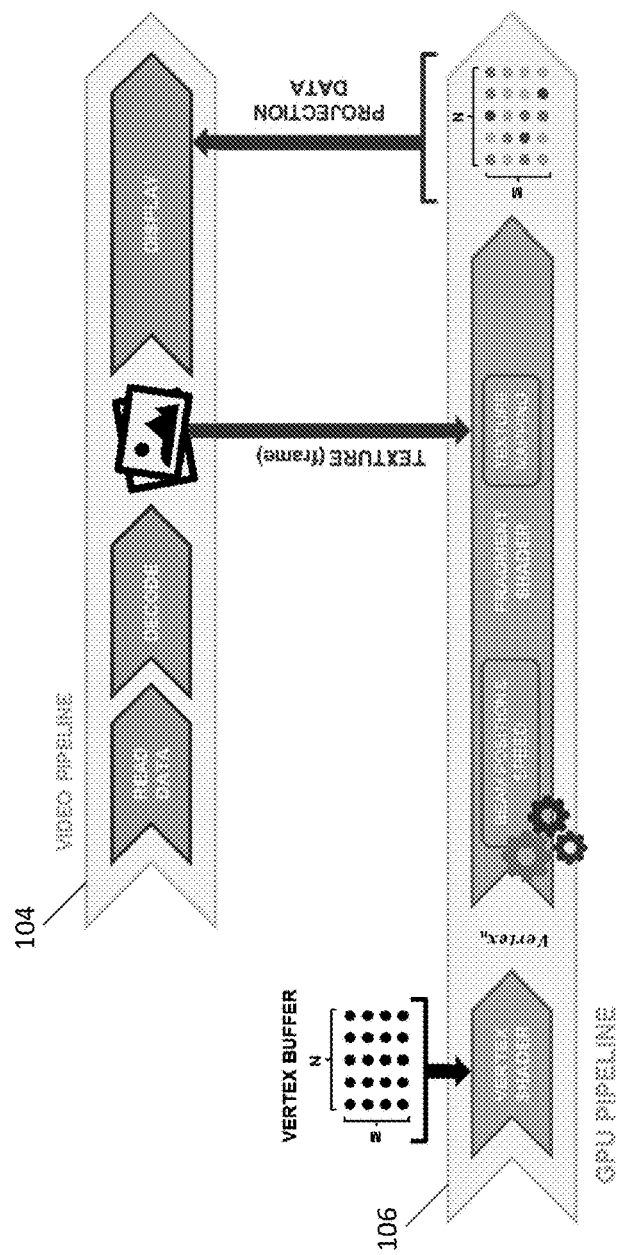
FIG. 2 is a diagram illustrating functions of the GPU pipeline and the video pipeline of FIG. 1.

With additional reference to FIG. 2, in operation, the application processor 102 receives video data in a video pipeline 104, such as read from non-volatile storage or from an external device. The video data in the pipeline is decoded. The GPU 106 defines a two dimensional grid or vertex buffer, with each element in the two dimensional grid representing the generated laser beam position (generated by the optical module 116) at a different time (or clock cycle). In a texture mapping or pre-distortion operation, the GPU 106 uses its parallelism to map each element of the two dimensional grid to a corresponding pixel of a frame of the video data from the pipeline 104, based upon the corresponding beam position for each element, in a parallel fashion. This mapping takes into account, and corrects for, geometric distortions caused by the fact that the scan patterns of the laser beam across the video display area are not evenly spaced lines, but are curved lines, and corrects for the geometric distortions. The purpose for the texture mapping or predistortion is that the displayed image or video be free from distortion.

There is no dependency between data elements, enabling these operations to be performed in parallel quickly. In addition, the ASIC 110 of the projection subsystem 108 receives the video data for each time (or clock cycle), as processed by the GPU 106.

The ASIC 110 then sends appropriate control signals to the mirror controller 112 and/or the light source driver 114. The control signals sent to the mirror controller 112 are a function of characteristics of the optical module 116 and the required mirror movement, while the control signals sent to the light source driver 114 are a function of the processed video data.

The light source driver 114 then appropriately drives the light sources 118 to generate collimated light. The optics 120 focus the collimated light, and then the mirrors 122, under control of the mirror controller 112, appropriately scan the collimated light across the target at a sufficient speed so as to produce a video image viewable by the human eye.

In some applications, such as that shown in FIG. 2, the beam position and beam speed for each element of the two dimensional grid can be determined on the fly by the GPU 106. Due to the scan patterns of the laser beam across the video display area, at some locations, the beam spot will be moving faster than at other locations. For example, the beam spot moves faster when toward the center of the video display area than when toward an edge of the video display area. Thus, it is to be understood that the beam position changes dependent upon the beam spot, and changes dependent on time.

Figure 3:
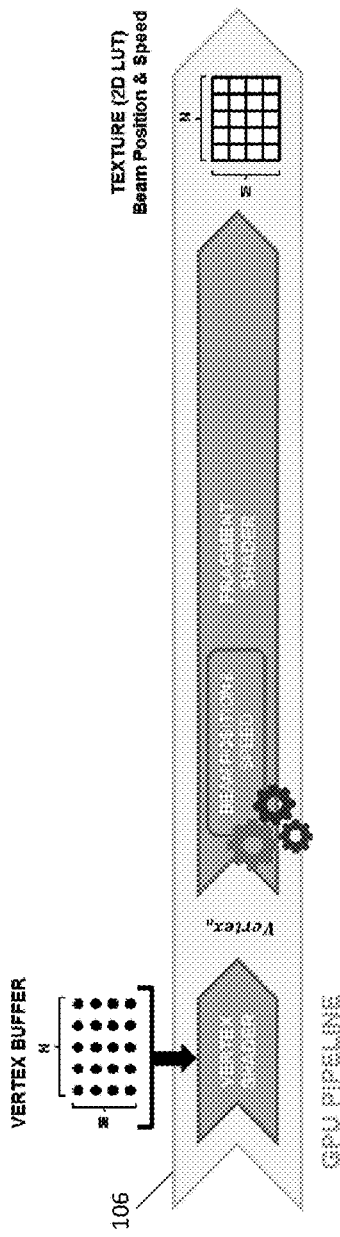
FIG. 3 is a diagram illustrating generation of a beam speed and position lookup table by the GPU pipeline of FIG. 1.
Figure 4:
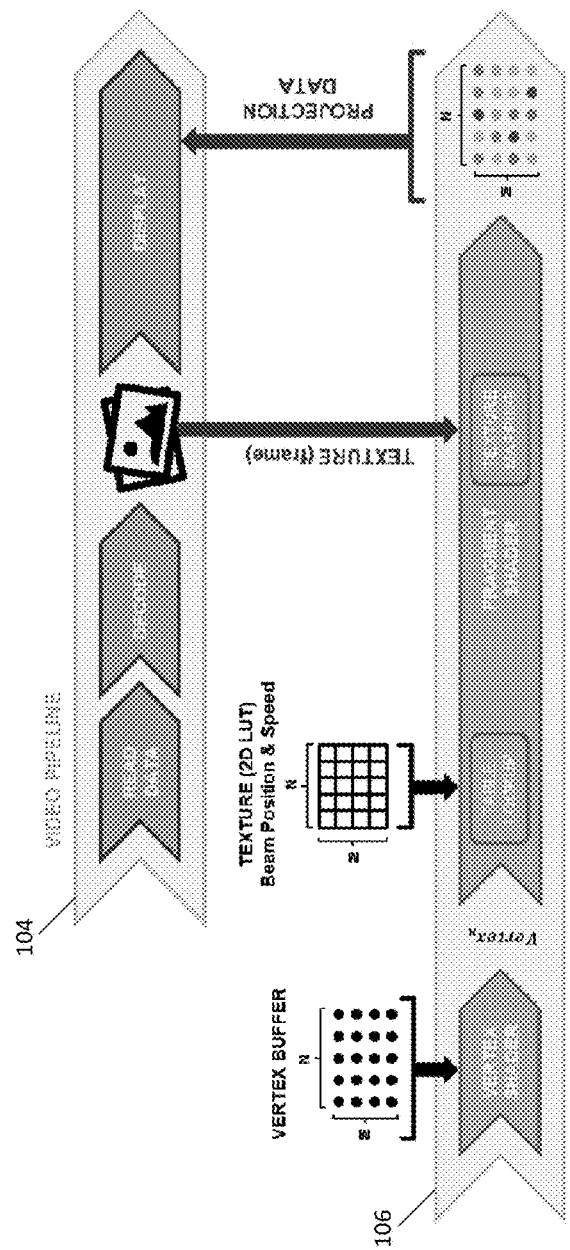
FIG. 4 is a diagram illustrating functions of the GPU pipeline and the video pipeline of FIG. 1 when using the beam speed and position lookup table as generated in FIG. 3.

In other applications, such as that shown in FIGS. 3-4, the beam position and beam speed for each element of the two dimensional grid can be determined in an initial setup phase by the GPU 106 (FIG. 3) and stored in a lookup table, and then during normal operation, rather than determination on the fly, the beam position and beam speed can retrieved from the lookup table (FIG. 4), reducing the computational load on the GPU 106.

In addition to the predistortion or texture mapping above that accounts for beam position, in some cases, the GPU 106 may also pre-modulate the elements of the two dimensional grid for intensity based upon the beam speed at those elements. Thus, an element having a higher beam speed may be modulated to have a higher intensity value than an element having a lower beam speed, and an element having a lower beam speed may be modulated to have a lower intensity value than an element having a higher beam speed. Such a case is shown in FIG. 1, where the video data as sent to the projection subsystem 108 is adjusted for beam speed.

Figure 5:
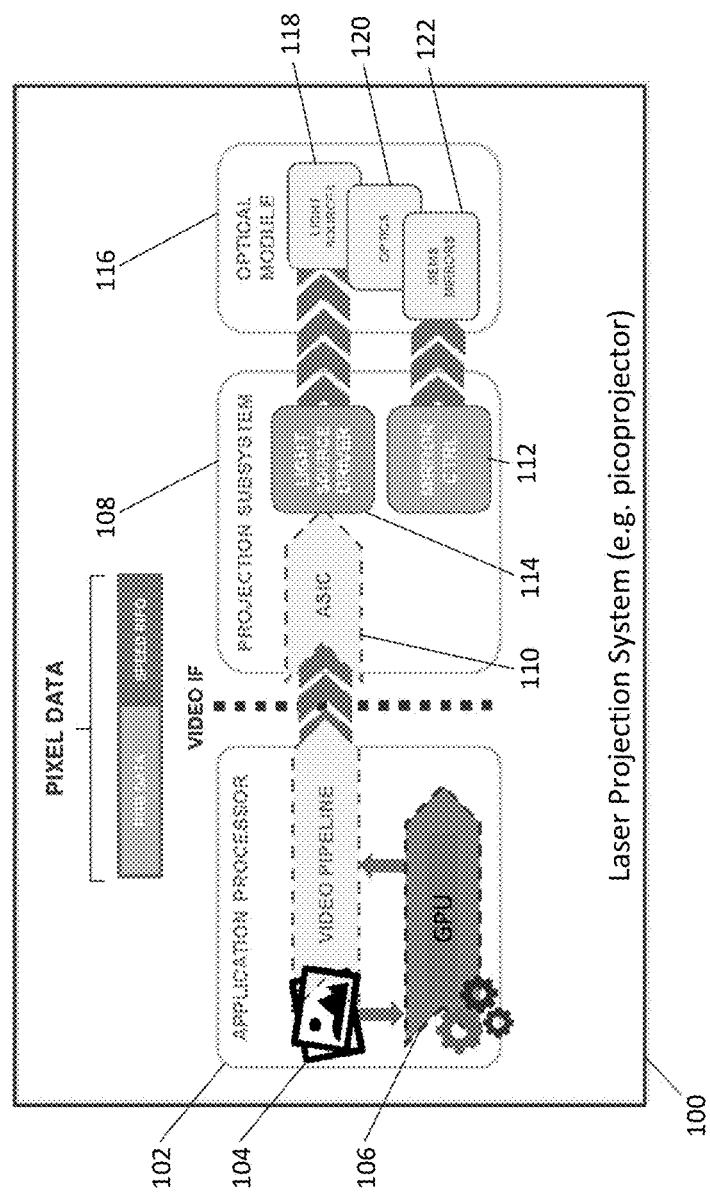
FIG. 5 is a diagram illustrating functions of the GPU pipeline and the video pipeline of FIG. 1, in an alternate embodiment

In other cases, however, the video data as sent to the projection subsystem 108 is not adjusted for beam speed, as shown in FIG. 5. Here, the beam speed is embedded with the video data as metadata by the GPU 106, and the modulation is performed by the ASIC 110.

Upsampling of the video data may be performed by either the GPU 106 or the ASIC 110 where desirable.

The above described texture mapping, as performed by the GPU 106 is specific for the optics 120 and mirrors 122 used within the optical module 116. Thus, this operation is dependent on the details of those pieces of hardware, and is not generic to any suitable optics 120 and mirrors 122. As a consequence, the GPU 106 is specially programmed for the specific purpose of texture mapping when using the specific optics 120 and specific mirrors 122 within the optical module 116.

The precomputation of the texture mapping, or predistortion by the GPU 106 therefore means that the ASIC 110 need not be specially programmed for the specific optics 120 and specific mirrors 122 within the optical module 116, and instead can be a generic ASIC 110 usable with any optics 120 and mirrors 122.

Figure 6:
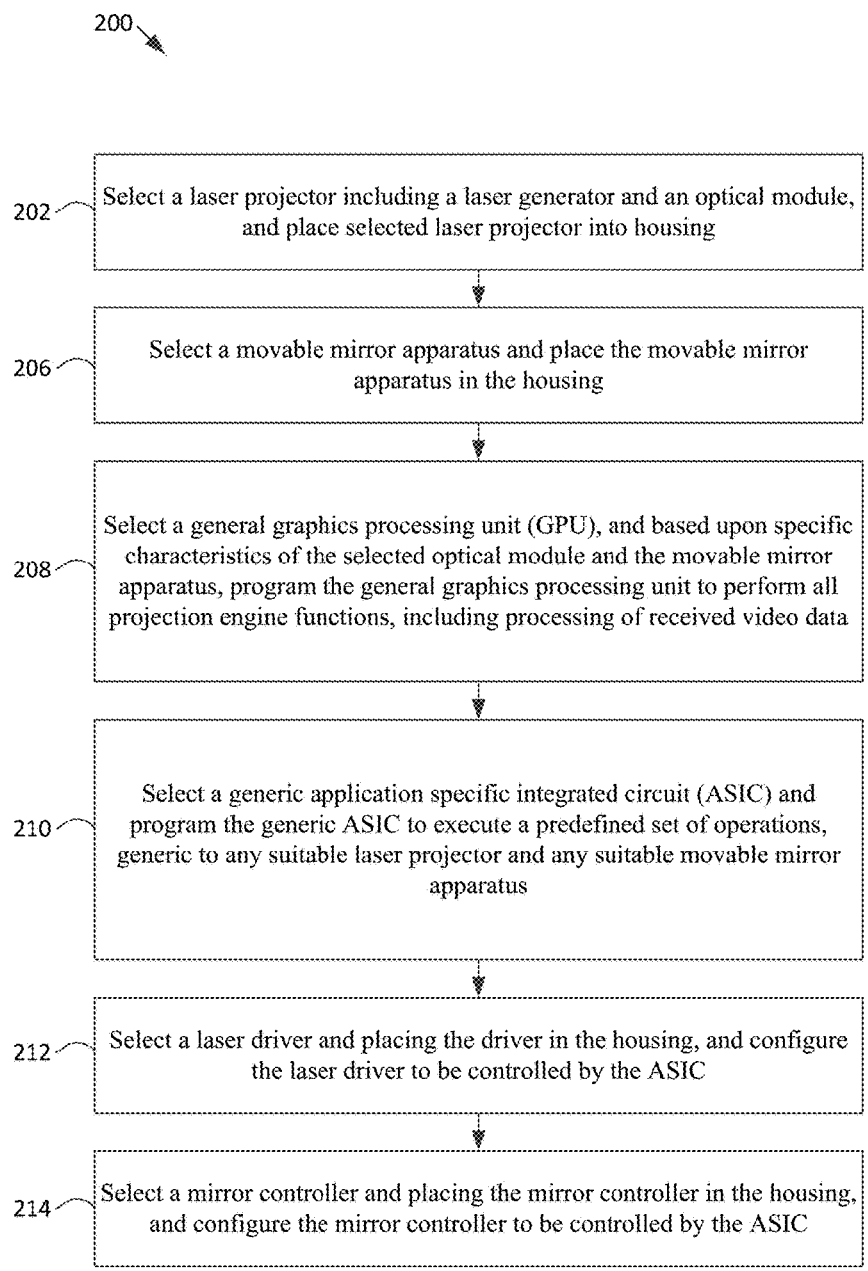
FIG. 6 is a flowchart of a method of making a laser projection system in accordance with this disclosure.

With reference to the flowchart 200 of FIG. 6, a method of making a laser projection system 100 in accordance with this disclosure is now described. The making of the laser projection system begins with selecting a laser projector (Block 202), which, as described above, includes a laser generator and an optical module. Then, the selected laser projector is placed into a housing for the laser projector. Thereafter, a movable mirror apparatus is selected and placed into the housing (Block 206). Then, a GPU is selected and programmed according to the specific characteristics of the selected optical module and selected movable mirror apparatus, so as to perform some or all projection engine functions and the processing of received video data (Block 208). This is a specific, special purpose programming, and only applies to the specific selected optical module and selected movable mirror apparatus; if this programming were, after creation, applied to a different optical module and/or different movable mirror apparatus, improper functioning would occur.

Next, a generic ASIC is selected and programmed to perform functions generic to any optical module and movable mirror apparatus (Block 210). Therefore, unlike the programming of the GPU, the programming of the ASIC is generic and applicable to multiple other optical modules and/or movable mirror apparatuses. Therefore, in some cases, an "off the shelf" pre-programmed ASIC may be used for a variety of different laser projection systems. Next, the laser driver is selected and placed into the housing (Block 212). Thereafter, the mirror controller is selected and placed in the housing, and is then configured to be controlled by the ASIC.

Although the above method steps have been described in a specific order, it is to be understood that this order is not limiting, that these steps may be performed in any order, and also that the placement of components into the housing may separately be performed in any order.

The invention claimed is:

1. A laser projection system, comprising:
a laser module configured to emit a laser beam;
a movable mirror apparatus configured to reflect the laser beam toward a surface;
a graphics processing unit (GPU) configured to:
  receive video data;
  estimate a position of the laser beam on the surface as a function of varying speed of movement of the movable mirror apparatus for different positions of the laser beam across the surface, based upon characteristics of the movable mirror apparatus; and
  process the video data based upon the estimated position of the laser beam on the surface;
an application specific integrated circuit (ASIC) configured to receive the processed video data, and to generate a beam position control signal based on characteristics of the movable mirror apparatus;
a laser driver configured to control the laser module as a function of the processed video data; and
a mirror controller configured to control the movable mirror apparatus as a function of the beam position control signal.

2. The laser projection system of claim 1, wherein the GPU is further configured to estimate a speed of the laser beam on the surface as a function of the varying speed of movement of the movable mirror apparatus for the different positions of the laser beam across the surface, based upon the characteristics of the movable mirror apparatus; and wherein the ASIC is configured to recover the estimated varying speed of movement of the movable mirror apparatus at different positions of the laser beam across the surface from the processed video data, and to further process the processed video data so as to modulate brightness of the processed video data based upon the estimated varying speed of movement of the movable mirror apparatus at different positions of the laser beam across the surface.

3. The laser projection system of claim 1, wherein the GPU is further configured to estimate a speed of the laser beam on the surface as a function of the varying speed of movement of the movable mirror apparatus for the different positions of the laser beam across the surface, based upon the characteristics of the movable mirror apparatus; and wherein the GPU is configured to process the video data so as to modulate brightness of the video data based upon the estimated varying speed of movement of the movable mirror apparatus at different positions of the laser beam across the surface.

4. The laser projection system of claim 1, wherein the video data would otherwise be displayed in a distorted fashion due to curved motion of the laser beam across the surface; and wherein the GPU processes the video data by predistorting the video data so as to produce predistorted video data that will display in a non-distorted fashion despite the curved motion of the laser beam across the surface, based upon the different positions of the laser beam across the surface.

5. The laser projection system of claim 4, wherein the GPU predistorts the video data by:
defining a two dimensional grid, with each element in the two dimensional grid representing the laser beam at a different time; and
mapping each location in the two dimensional grid to a corresponding pixel of a frame of the received video data based upon the different positions of the laser beam in the curved motion across the surface.

6. The laser projection system of claim 1, wherein the GPU is further configured to estimate a speed of the laser beam on the surface as a function of the varying speed of movement of the movable mirror apparatus for the different positions of the laser beam across the surface, based upon the characteristics of the movable mirror apparatus; and wherein the GPU processes the video data by embedding the estimated varying speed of movement of the movable mirror apparatus at the different positions of the laser beam across the surface in the processed video data as metadata.

7. The laser projection system of claim 1, wherein laser module includes a laser generator configured to generate a collimated light beam and an optical module configured to focus the collimated light beam into the laser beam; and wherein the GPU also calculates the varying speed of movement based upon characteristics of the optical module and characteristics of the movable mirror apparatus.

8. The laser projection system of claim 7, wherein the ASIC is generic to optical modules regardless of characteristics thereof and is generic to movable mirror apparatuses regardless of characteristics thereof.

9. The laser projection system of claim 1, wherein the GPU has a massively parallel architecture.

10. The laser projection system of claim 1, wherein the GPU is not an application specific integrated circuit (ASIC).

11. The laser projection system of claim 1, wherein there is no dependency between data elements used in generating the beam position control signal.

12. The laser projection system of claim 1, wherein the GPU processes the video data by upsampling the video data.

13. The laser projection system of claim 1, wherein the GPU, during a setup phase, stores the estimated varying speed of movement of the movable mirror apparatus at the different positions of the laser beam across the surface in a lookup table as beam speed and beam position values.

14. The laser projection system of claim 13, wherein the GPU, during subsequent operation, estimates the varying of movement of the movable mirror apparatus at the different positions of the laser beam across the surface by performing a lookup in the lookup table.

15. A laser projection system, comprising:
a graphics processing unit (GPU) configured to:
receive video data and process the video data; and
based upon the video data, in parallel,
define a two dimensional grid, with each element in the two dimensional grid representing a laser beam at a different time; and
map each element of the two dimensional grid to a corresponding pixel of a frame of received video data based upon a beam position and beam speed for each element such that each element of the two dimensional grid contains appropriate information to be used to project a correct pixel at a correct time;
an application specific integrated circuit (ASIC) configured to receive the mapped pixels from the GPU, and to generate a beam position control signal based on characteristics of a movable mirror apparatus; and
a mirror controller configured to control the movable mirror apparatus to be used in the laser projection system as a function of the beam position control signal.

16. The laser projection system of claim 15, wherein the GPU also calculates the beam speed and beam position based upon characteristics of an optical module to be used in the laser projection system as well as characteristics of the movable mirror apparatus.

17. The laser projection system of claim 16, wherein the ASIC is generic to optical modules regardless of characteristics thereof and is generic to movable mirror apparatuses regardless of characteristics thereof.

18. The laser projection system of claim 15, wherein the GPU has a massively parallel architecture.

19. The laser projection system of claim 15, wherein there is no dependency between data elements used in generating the beam speed and the beam position.

20. A method of manufacturing a laser projection system, comprising:
selecting a laser projector including a laser generator and an optical module, and placing the selected laser projector into a housing;
selecting a movable mirror apparatus and placing the movable mirror apparatus in the housing;
selecting a graphics processing unit (GPU), and based upon specific characteristics of the selected optical module and the movable mirror apparatus, programming the GPU to perform projection engine functions, including beam speed determination, beam position determination, and processing of received video data based upon the beam speed determination and the beam position determination;
selecting a generic application specific integrated circuit (ASIC) and programming the generic ASIC to execute a predefined set of operations, generic to multiple different suitable laser projectors and multiple suitable different movable mirror apparatuses, based upon at least the processed video data, as received from the GPU;
selecting a laser driver and placing the driver in the housing, and configuring the laser driver to be controlled by the ASIC; and
selecting a mirror controller and placing the mirror controller in the housing, and configuring the mirror controller to be controlled by the ASIC.

21. The method of claim 20, wherein the predefined set of operations to be executed by the ASIC include further processing the processed video data so as to modulate brightness of the processed video data based upon the determined beam speed at different positions of the laser beam across the display surface.

22. The method of claim 20, further comprising programming the GPU to process the video data so as to modulate brightness of the video data based upon the beam speed determination.

23. The method of claim 20, wherein the video data would otherwise be displayed in a distorted fashion; and wherein the GPU is programmed to process the video data by predistorting the video data so as to produce predistorted video data that will display in a non-distorted fashion, based upon the position determination.

24. The of claim 23, wherein the GPU is programmed to predistort the video data by:
defining a two dimensional grid, with each element in the two dimensional grid representing a laser beam produced by the laser projector at a different time; and
mapping each location in the two dimensional grid to a corresponding pixel of a frame of the received video data based upon the beam position determination.

25. The method of claim 20, wherein the GPU is programmed to processes the video data by embedding the beam speed determination and beam position determination as metadata.

26. The method of claim 20, wherein the GPU is selected as a GPU having a massively parallel architecture.

27. The method of claim 20, wherein the GPU is programmed to process the video data by upsampling the video data.

* * * * *